Dec. 30, 1969 D. W. ING ET AL 3,486,953

SELECTIVE REMOVAL OF DENDRITES FROM DENDRITIC WEBBED SEMICONDUCTOR MATERIAL

Filed May 26, 1966

WITNESSES:

Bernard R. Gieguez

Donald M. Winegar

INVENTORS
David W. Ing and
Thomas J. Hunt.

BY

C. L. Menzemer

ATTORNEY 3,486,953

SELECTIVE REMOVAL OF DENDRITES FROM DENDRITIC WEBBED SEMICONDUCTOR MATERIAL

David W. Ing, Pittsburgh, and Thomas J. Hunt, Latrobe, Pa., assignors to Westinghouse Electric Corporation, Pittsburgh, Pa., a corporation of Pennsylvania Filed May 26, 1966, Ser. No. 553,148
Int. Cl. C03c *15/00*; H01l *7/00*
U.S. Cl. 156—17 6 Claims This invention relates to a chemical technique for the selective removal of dendrites from web dendritic semiconductor material.

Figure 1:
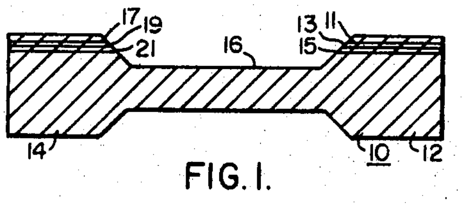

A sheet of web dendritic semiconductor material is an elongated body of semiconductor material consisting of at least two substantially parallel elongated dendritic crystals joined crystallographically into a unitary body by a web portion extending between the dendritic crystals over the length of the body.

Reference should be had to U.S. Patents 3,129,061 and 3,162,507 for a complete teaching of how a sheet of webbed dendritic semiconductor material is prepared.

It is desirable that the dendritic crystals or dendrites be removed from the web portion in order to obtain a more suitable material for use in fabricating semiconductor devices. In addition, to achieve a good expitaxial deposition on webbed dendritic semiconductor material, it is also desirable that the dendrites be removed from the web portion.

Retention of the dendrites on the web portion sometimes makes it difficult to employ photoresist masking techniques because of the difference in height which sometimes occurs between the dendrites and the web portion of the sheet.

Presently, the dendrites are removed from the web portion of the sheet of dendritic webbed semiconductor material by sand blasting. To protect the web portion which is to be used for device making, a wax mask is disposed on both sides of the material comprising the web portion. The sheet is then placed in a traveling jig and the dendrites are removed from one edge of the sheet material by sand blasting. A second passage utilizing the sam jig and process removes the dendrites from the second edge of the sheet. The remaining portion of the dendritic webbed semiconductor material comprising the web portion of the sheet is then removed from the jig, dewaxed and cleaned.

An object of this invention is to provide a chemical process for removing dendrites from a sheet of webbed dendritic semiconductor material.

Other objects of the invention will, in part, be obvious and will, in part, appear hereinafter.

In order to more fully understand the nature and object of the invention, reference should be had to the following description and drawings, in which:

FIGURES 1 through 7 inclusive are cross-sectional views of a sheet of dendritic webbed semiconductor material being processed in accordance with the teachings of this invention.

In accordance with the present invention and in attainment of the foregoing objects, there is provided a process for selectively removing dendrites from a body of webbed dendritic semiconductor material, the body comprising at least two substantially parallel dendritic crystals joined crystallographically into a unitary body by a web portion extending between the dendritic crystals over the length of the body, the process comprising forming a layer of an oxide of the semiconductor material on the surface of the sheet, disposing a masking layer of wax on the oxide layer on the web portion of the body, disposing the body in hydrofluoric acid whereby the oxide layer is etched away from th surfaces of the dendritic crystals, removing the layer of wax from the oxide layer on the web portion, and disposing the body in the heated aqueous solution whereby the dendrites are chemically etched from the web portion of the body.

To simplify the description of the invention, and for no other purpose, the invention will be described in terms of a body, or a sheet, of webbed dendritic silicon semiconductor material.

With reference to FIG. 1, there is shown a cross-sectional view of a sheet 10 of dendritic webbed semiconductor material. The sheet 10 is an elongated body of semiconductor material comprising two substantially parallel elongated dendritic crystals 12 and 14 joined crystallographically into a unitary body by a web portion 16 extending between the dendritic crystals 12 and 14 over the length of the body. The same semiconductor material, silicon, comprises the dendritic crystals 12 and 14 and the web portion 16.

The web portion 16 is usually single crystal and is so shown in the drawings and the crystallographic plane of its surface is 111. Each dendrite 12 and 14 has three intermediate parallel interior twin planes 11, 13 and 15 and 17, 19 and 21, respectively.

The sheet 10 with the asymmetric twin planes 11, 13, 15, 17, 19 and 21 relative to the web portion 16 is the preferred structure for semiconductor device manufacture. This is because none of the twin planes extends into or across the web portion 16.

Figure 2:
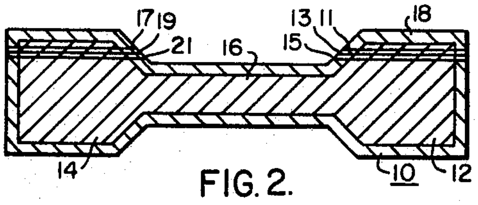

With reference to FIG. 2, there is shown the sheet 10 of webbed dendritic silicon semiconductor material after the material on the outer surfaces has been oxidized to form a layer 18 of silicon oxide about the entire sheet 10. Any suitable oxidation process such, for example, as steam oxidation at 1200° C. employing argon gas or nitrogen gas bubbled through hot water, may be employed to form the layer 18 of silicon oxide. An oxide thickness of from 10,000 Angstrom units to 12,000 Angstrom units has been found sufficient.

The preferred portion of the sheet 10 which is most suitable for device making is the web portion 16.

Figure 3:
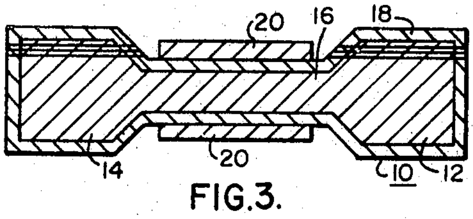

With reference to FIG. 3, a layer 20 of wax masking material such, for example, as the wax available commercially and sold under the trade name of Apiezon, is disposed on the web portion 16. The thickness of the layer 20 is from 1 mil to 5 mils. The preferred minimum thickness is 2 mils in order to prevent pin holes from occurring in the layer 20 which would then leave areas of the web portion 16 unmasked.

Figure 4:
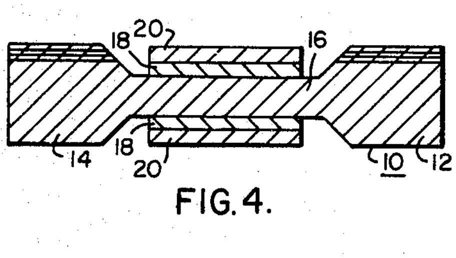

With reference to FIG. 4, the sheet 10 of webbed dendrite silicon semiconductor material is shown after the layer 18 of silicon oxide has been removed from the surfaces of the dendrites 12 and 14. The removal of the silicon oxide layer 18 from the surfaces of these dendrites 12 and 14 is accomplished by etching the sheet 10 in a solution of hydrofluoric acid. The hydrofluoric acid may be either in a concentrated or a dilute solution form. A soltuion of 30% to 40%, by weight, of hydrofluoric acid is preferred.

If pin holes had existed in the layer 20, the silicon oxide in the layer 18 beneath the layer 20 would have been attacked by the hydrofluoric acid and the silicon oxide in the vicinity of the pin holes would have been removed by etching.

The sheet 10 is then rinsed in deionized water and dried.

Figure 5:
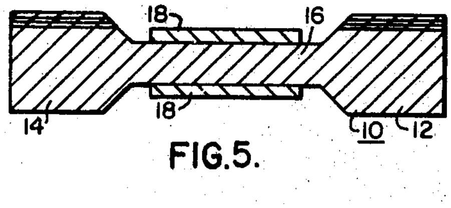

Referring now to FIGS. 4 and 5, the layer 20 of masking material is removed from the sheet 10 of webbed dendritic silicon semiconductor material. The layer 20 of masking material may be removed by such suitable means as by placing the sheet 10 in boiling trichloroethylene.

Figure 6:
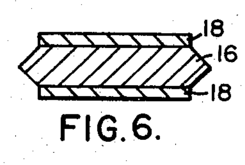

The sheet 10 is then placed in an aqueous solution of a compound selected from the group consisting of sodium hydroxide and potassium hydroxide. The solution preferentially attacks the dendrites 12 and 14, chemically etching them until they have completely dissolved in the solution. The layer 18 of silicon oxide protects the web portion 16 while the sheet 10 is in the solution. When the dendrites 12 and 14 have been etched away and dissolved, the sheet 10 is removed from the solution. A cross-sectional view of the resulting structure is shown in FIG. 6.

The temperature of the aqueous solution is preferably at least 80° C. At this temperature and above the rate of chemical etching of the dendrites is more rapid than at lower temperatures. The web portion 16 is not adversely affected by the faster etching rate.

The concentration of the solution may vary from as low as 5%, by weight, of either sodium hydroxide or potassium hydroxide in water to as high as 50%, by weight, of either sodium hydroxide or potassium hydroxide in water. A preferred solution concentration is 20%, by weight, of either sodium hydroxide or potassium hydroxide in water.

Although a concentration of only 1%, by weight, of either compound in an aqueous solution will chemically etch the dendrites 12 and 14, the elapsed time required to completely dissolve the dendrites is too great to be desirable. On the other hand, concentrations above 10%, even without heating, begin to pose hazardous working conditions for all engaged in etching the dendrites 12 and 14 from the sheet 10. Consequently, an aqueous soltuion having a concentration of 20%, by weight, of either compound, when heated to a temperature of 80° C. or higher, has been found to present the most desirable balance between the fastest chemical etching rate obtainable with the optimum allowable hazardous working conditions permitted for the adequate safety of the persons engaged in the process.

In addition to the oxide layer 18 preventing any chemical etching of the web 16, the preferential chemical etching of the dendrities 12 and 14 is possible because of the difference of the crystalline structure orientation of the dendrites 12 and 14 when compared to the surface of the web portion 16. The surface of the web portion 16 has a crystalline structure orientation of 111. All the web portions have a knife edge remaining after the chemical etching step because of the preferential etching which occurs.

Additionally, it is believed that internal stresses and structural imperfections within the dendrites 12 and 14 may enhance the selective chemical etching which occurs in this process.

If surface flatness of the web portion 16 is not a prime requirement, the process of forming the layer 18 of silicon oxide may be eliminated. The etching solution of sodium hydroxide or potassium hydroxide will only slightly chemically etch the crystallographically perfect web portion 16 of the sheet 10. Simultaneously, however, the solution of sodium hydroxide or potassium hydroxide vigorously etches away the dendritic crystals 12 and 14 and any surface imperfections which may exist on the web portion 16. The dendritic crystals 12 and 14, however, will be removed before any significant amount of silicon is removed from the web portion 16.

Figure 7:
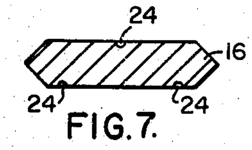

The result of this form of processing the sheet 10 is the web portion 16, the surfaces of which have pits 24 denoting the sites of imperfections removed by the chemical etching process. FIG. 7 is a cross-sectional view of the web portion 16 remaining after the sheet 10 of dendritic webbed silicon semiconductor material has been processed without first oxidizing the sheet 10.

Although the surface of the web portion 16 is not as flat as the surface obtained when the step of first forming a layer of silicon oxide is included in the process, the web portion 16 is still suitable for certain device fabrication applications where surface flatness is not essential. Diodes and transistors which do not require extremely flat surfaces may be made from the web portion 16.

The following examples are illustrative of the teachings of this invention.

EXAMPLE I

A sheet of P-type dendritic webbed silicon semiconductor material was placed in a tube furnace having an argon steam atmosphere obtained by bubbling argon gas through hot water. The sheet was 10 centimeters in length, 1 centimeter in width and had a resistivity of 23 ohm-centimeters. The dendrites each averaged 1 millimeter in width and the web portion averaged 8 millimeters in width.

The sheet of dendritic webbed silicon semiconductor material was heated to a temperature of 1200° C.±10° C. in the atmosphere of argon-steam for a period of one hour. The surfaces were oxidized and the formation of a layer of silicon oxide 10,000 angstrom units in depth occurred.

Each surface of the web portion of the sheet of dendritic webbed silicon semiconductor material was coated with a 2 mil masking layer of Apiezon wax.

The partially masked sheet was then placed in a concentralized solution of 49% by weight of hydrofluoric acid to be etched. The etching of the sheet was carried on in the hydrofluoric acid solution for one minute.

The sheet was removed from the hydrofluoric acid solution, rinsed in deionized water and examined. The silicon oxide layer had been removed from all surfaces of the dendrites.

The sheet was next placed in boiling trichloroethylene for a period of two minutes to remove all of the masking layer of Apiezon wax.

The sheet was then placed in a hot solution of potassium hydroxide. The temperature of the solution was 98° C.±2° C. The concentration of the potassium hydroxide solution was 20% by weight of potassium hydroxide in water.

The sheet was etched in the potassium hydroxide solution for twenty minutes until all of the dendritic crystals had been removed and only the web portion remained. The web portion was removed from the solution, rinsed with deionized water and examined.

All of the dendritic crystals had been completely removed from the web portion. The web portion, or simply the web, protected by the layer of silicon oxide, had not been attacked by the solution.

The silicon oxide was then removed from the web portion of the sheet by etching the web portion in a concentrated solution of 49% by weight of hydrofluoric acid. The web was then rinsed in deionized water, then in methanol and then blown dry.

The web of the P-type silicon semiconductor material was then disposed in an epitaxial growing apparatus. An N-type semiconductivity layer of epitaxially grown silicon, .001 of an inch in thickness, was deposited on the web.

The epitaxial layer of silicon resulted from the pyrolytic decomposition of silicon tetrachloride at an elevated temperature of 1175° C.±50° C. in an atmosphere of hydrogen. The required dopant material to make the epitaxial layer an N-type semiconductivity region was obtained from a source which consisted of 25 cubic centimeters of phosphine in 8 liters of hydrogen. Thirty cubic centimeters per minute of this phosphine in hydrogen was flowed through the apparatus continuously during the epitaxial growth of the silicon resulting in the N-type layer of silicon.

Employing a standard photoresist technique well known to those skilled in the art, 25 diodes were prepared employing the web of P-type material with its N-type epitaxial layer.

The web containing the 25 diodes was heated in an oven at 90° C. for two hours.

An electrical test probe was touched to each side of each diode formed in the web to determine the breakdown voltage for each diode which proved to be up to approximately 1000 volts.

EXAMPLE II

A sheet of P-type semiconductivity dendritic webbed semiconductor material was placed in a hot solution of sodium hydroxide. The temperature of the solution was 98° C.±20 C. The concentration of the hydroxide solution was 20% by weight of sodium hydroxide in water.

The sheet was 10 centimeters in length, 1 centimeter in width and had a resistivity 23 ohm-centimeters. The dendrites each averaged 1 millimeter in width and the web portion averaged 8 millimeters in width.

The sheet was etched in the sodium hydroxide solution for 25 minutes until all of the dendritic crystals had been removed. The remaining web portion of the sheet was removed from the solution, rinsed with deionized water and examined.

All of the dendritic crystals had been completely removed from the sheet. The remaining web portion showed isolated etching attacks of the hydroxide solution on various parts of the exposed surfaces of the web. The resulting effect of these isolated etching attacks were to give the surfaces of the web portion a dimpled or pitted appearance.

In the same manner as described in Example I, the web portion of P-type silicon semiconductor material had an N-type silicon epitaxial layer of semiconductor material deposited upon it. Twenty-five diodes were fabricated from the material of the web portion.

An electrical test of each diode showed a breakdown voltage of up to approximately 1000 volts.

The results indicate that selective etching of the dendritic crystals from a sheet of webbed silicon semiconductor does not harm the electrical properties of the web portion. The only detrimental effect noted was the uneven surface of the web portion which resulted when the surfaces of the web portion were not protected during the preferential etching of the dendrites.

The unexpected result of a preferred hydroxide solution preferentially etching the dendrite crystals in preference to the web portion of a sheet of webbed semiconductor material has greatly reduced the processing time previously required for preparing suitable device material from the sheet. Additionally, another unexpected result was that the preferential etching does not affect the electrical properties of the resulting device material.

While the invention has been described with reference to particular embodiments and examples, it will be understood, of course, that modifications, substitutions and the like may be made therein without departing from its scope.

We claim as our invention:

1. A process for selectively removing dendrites from a body of silicon webbed dendritic semiconductor material, the body comprising at least two substantially parallel dendritic crystals joined crystallographically into a unitary body by a web portion extending between the dendritic crystals over the length of the body, the process comprising disposing the body in an aqueous solution of a compound selected from the group consisting of sodium hydroxide and potassium hydroxide heated to a temperature of at least 80° C. whereby the dendritic crystals are selectively chemically etched from the web portion of the body leaving the web portion substantially unaffected by the solution.

2. The process of claim 1 in which the aqueous solution consists of from 10 to 50 percent by weight of at least one material selected from the group consisting of potassium hydroxide and sodium hydroxide.

3. The process of claim 1 in which the aqueous solution consists of 20 percent by weight of at least one material selected from the group consisting of potassium hydroxide and sodium hydroxide.

4. The process of claim 1 in which the concentration of the compound in the aqueous solution is from 10 percent to 50 percent, by weight.

5. The process of claim 1 in which the concentration of the compound in the aqueous solution is 20 percent, by weight.

6. The process of claim 1 including the following process steps preceding the step of disposing the body in the heated aqueous solution:

forming a layer of an oxide of the semiconductor material on the surface of the body, disposing a masking layer of wax on the oxide layer of the web portion of the body, disposing the body in hydrofluoric acid whereby the oxide layer is etched away only from the surfaces of the dendritic crystals, and removing the layer of wax from the oxide layer of the web portion.

References Cited

UNITED STATES PATENTS

| | | | |
|---|---|---|---|
| 3,122,817 | 3/1964 | Andrus | 29—25.3 |
| 3,162,507 | 12/1964 | Dermatis et al. | 23—1 |
| 3,234,058 | 2/1966 | Marinace | 148—175 |
| 3,266,961 | 8/1966 | Emeis | 156—17 |

JACOB H. STEINBERG, Primary Examiner

U.S. Cl. X.R.

23—223.5; 148—1.6